(12) United States Patent
Witte et al.

(10) Patent No.: US 7,823,493 B2
(45) Date of Patent: Nov. 2, 2010

(54) CUTTING TABLE AND METHOD FOR CUTTING PROFILED SECTIONS

(75) Inventors: Heinz-Dieter Witte, Hilter (DE); Uwe Holzlöhner, Dissen (DE)

(73) Assignee: Maschinen Witte GmbH & Co. KG, Hilter (DE)

( * ) Notice: Subject to any disclaimer, the term of this patent is extended or adjusted under 35 U.S.C. 154(b) by 151 days.

(21) Appl. No.: 11/615,016

(22) Filed: Dec. 22, 2006

(65) Prior Publication Data

US 2007/0144320 A1 Jun. 28, 2007

(30) Foreign Application Priority Data

Dec. 24, 2005 (DE) .................. 10 2005 062 305

(51) Int. Cl.
*B23D 19/04* (2006.01)
(52) U.S. Cl. .................. 83/471.3; 83/490; 83/581; 83/468.3
(58) Field of Classification Search ........ 83/471–471.3, 83/490, 581, 468, 468.3, 483, 745; 33/806, 33/809, 811, 807, 808
See application file for complete search history.

(56) References Cited

U.S. PATENT DOCUMENTS

| 145,354 | A | * | 12/1873 | Loetscher | 83/477 |
| 307,600 | A | * | 11/1884 | Thomas | 83/477.1 |
| 2,648,381 | A | * | 8/1953 | Engel | 83/36 |
| 2,940,485 | A | * | 6/1960 | Zern | 83/404.1 |
| 3,578,043 | A | * | 5/1971 | Menge | 83/471.3 |
| 4,441,394 | A | * | 4/1984 | Barsotti | 83/409 |
| 5,379,670 | A | * | 1/1995 | Ferry | 83/468 |
| 5,743,161 | A | * | 4/1998 | Boudreau | 83/435.11 |
| 5,809,857 | A | * | 9/1998 | Owen | 83/404.1 |
| 5,934,164 | A | * | 8/1999 | Whatley, Jr. | 83/471.1 |
| 6,615,689 | B2 | * | 9/2003 | Kobayashi | 74/640 |
| 2005/0155475 | A1 | * | 7/2005 | Desrosiers | 83/76.9 |

FOREIGN PATENT DOCUMENTS

| DE | 86 24 332.2 U1 | 1/1987 |
| DE | 19604021 A1 * | 8/1997 |
| EP | 1 038 645 A1 | 9/2000 |
| EP | 1800783 A1 * | 6/2007 |
| WO | 03/101687 A1 | 12/2003 |

* cited by examiner

*Primary Examiner*—Ghassem Alie
(74) *Attorney, Agent, or Firm*—Gudrun E. Huckett

(57) ABSTRACT

A cutting table arrangement for profiled sections to be joined at a predetermined angular position at miter cuts. The cutting table arrangement has a cutting table, an angle-adjustable cutting device arranged on the cutting table, a first holding device arranged on the cutting table for holding a first straight profiled section in alignment with the first cutting device, and at least one second holding device for a second profiled section that is to be secured in a predetermined position and at a predetermined angle relative to the first profiled section on the cutting table. A first marking aid is provided at the first holding device for providing an aligned lateral extension toward the second profiled section. A second marking aid is provided for indicating the cutting line correlated to the first cutting device.

9 Claims, 3 Drawing Sheets

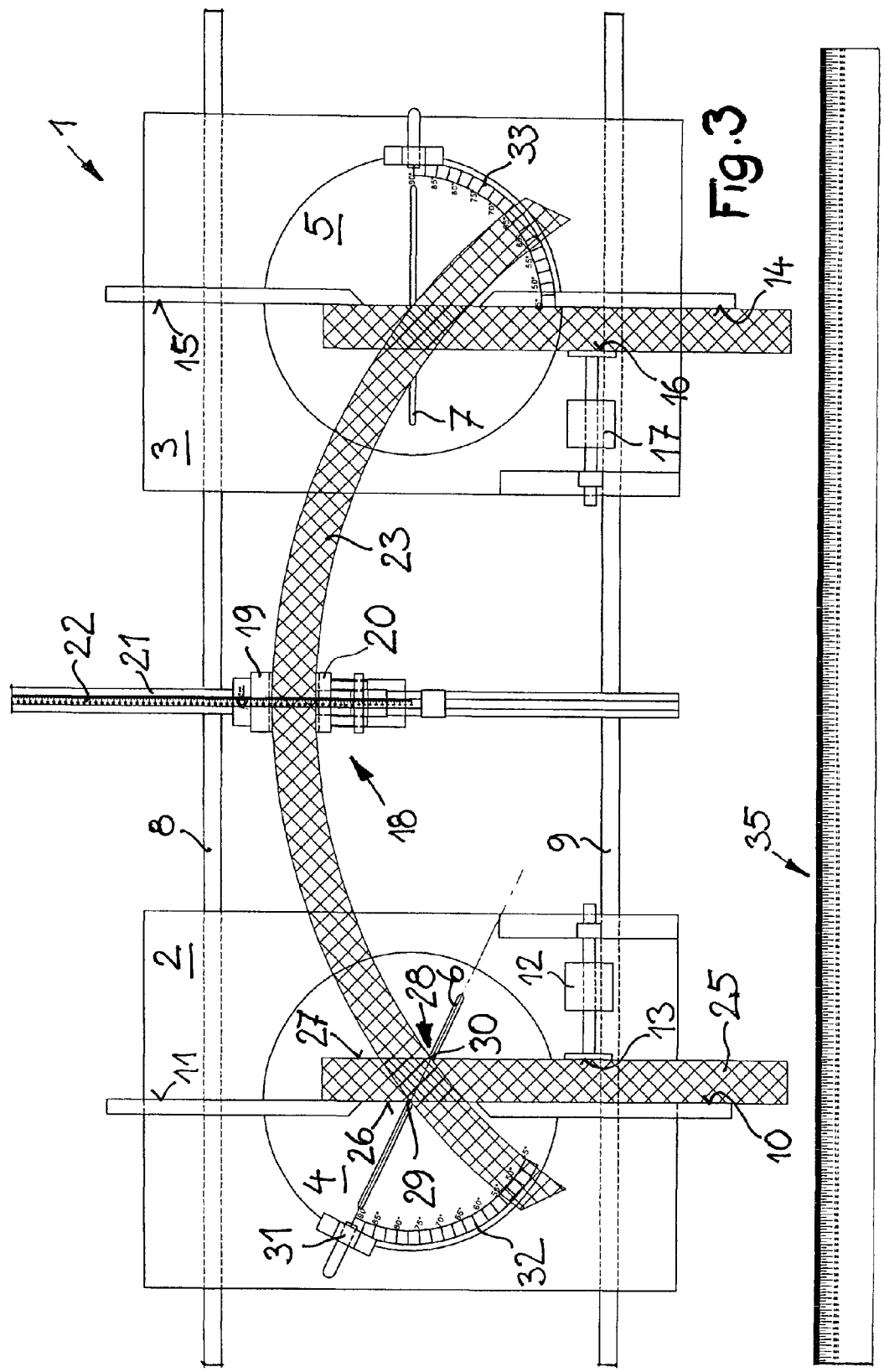

CUTTING TABLE AND METHOD FOR CUTTING PROFILED SECTIONS

BACKGROUND OF THE INVENTION

The invention relates to a cutting table arrangement for profiled sections, in particular profiled sections made from plastic material, for making door frames and window frames. The profiled sections are miter-cut and to be joined precisely with regard to their cross-section in a predetermined angular position. A first holding device is provided on the cutting table for a first straight profiled section and is oriented toward an angle-adjustable cutting device.

The invention further relates to a method for cutting profiled sections, in particular profiled sections made from plastic material, for making doorframes and window frames joined by a miter joint, wherein the first straight profiled section is secured on the cutting table in a predetermined direction of the first holding device that is oriented toward the angle-adjustable cutting device.

For profiled sections that are to be precisely joined at an angle with regard to their surfaces without creating any steps, miter cuts are provided wherein both ends to be joined of the profiled sections are cut at identical (but oppositely oriented) angles. However, securing based on the cutting angle is non-uniform and difficult when, for example, different angles or even arched profiled sections have to be taken into account. In addition to the quantity of profiled sections to be joined precisely with a miter joint at the outer contour, in the case of profiled sections made from plastic material for making door frames or window frames having inner webs, it is also important that these inner webs will meet at their ends for fusing or welding.

In the case of conventional marking or cutting tables, templates are used for this purpose; they are able to provide, based on marking or drawing the profiled section, a pattern and a stop means for cutting; however during alignment of the profiled sections and of the cutting device there is the risk of errors and imprecision. Moreover, they require a lot of preparation and alignment time.

SUMMARY OF THE INVENTION

It is an object of the present invention to provide a cutting table arrangement for profiled sections and a method for cutting profiled sections with which a simpler, more reliable, and more precise cutting of profiled sections is possible and, in particular, enables also precise terminal cross-sections of the profiled sections (including profiled sections with a multi-chamber configuration divided by means of intermediate webs) made from plastic material for making door frames and window frames for the purpose of welding the abutting surfaces.

In accordance with the present invention, this is achieved in regard to the cutting table in that at least one second holding device is provided on the cutting table for a second profiled section to be secured in a predetermined position and at a predetermined angle relative to the first profiled section on the cutting table, in that at least one first marking aid is provided on the first holding device for marking its aligned lateral extension relative to the second profiled section, and in that a second marking aid for marking the cutting line is connected to the cutting device.

In accordance with the present invention, this is achieved in regard to the method in that at least one second profiled section is secured precisely with regard to position and angle relative to the first profiled section in the area of the cutting device and is secured in a second holding device across lateral alignment lines of the first profiled section, in that the lateral alignment lines of the first profiled section are marked on the second profiled section, in that the cutting device is aligned for performing a miter cut relative to the markings on the second profiled section and is actuated, and in that the first profiled section in the first holding device is longitudinally moved to the cutting device and is cut at the same angle position of the cutting device as the second profiled section.

The cutting table arrangement according to the invention provides a first holding device for a first profiled section and a second holding device for a second profiled section by means of which the two profiled sections that are to be aligned with one another and to be provided with a miter cut at both ends are shown in the nominal position. In this connection, the second profiled section that may be optionally curved is secured on the cutting table while the first profiled section that is to be a straight profiled section is also secured in its nominal position but in such a way that it is displaced longitudinally in order to not be in the way of the second profiled section. The first profiled section can also be replaced by a model or template or the like of the same width or can even be simulated by an empty position of the holding device because, for creating the markings, it is only important to maintain the alignment of the lateral lines of the straight first profiled section across the end area of the second profiled section.

A marking aid for the aligned lateral sides of the first profiled section to the second profiled section can therefore be in the form of an appropriate model or template that is secured and aligned by means of the first holding device and thus enables marking on the second profiled section the extension of the lateral sides. The marking aid can also be, for example, a light pointer, in particular laser light pointers, that are connected to the first holding device and, for example, in the case of a holding device with lateral clamping jaws, indicate the aligned extension of the clamping jaw surfaces relative to the second profiled section so that on the second profiled section the overlapping contours of the first profiled sections are made visible.

With different possible shapes of such a marking aid, a square comprised of the aligned lateral sides of the first profiled section and of the predetermined lateral sides of the second profiled section is created on the second profiled section in a plan view, wherein one of the diagonals of the square determines the cutting line for the miter cut.

The angle-adjusted cutting device is adjusted relative to this diagonal line for the miter cut by means of a further marking aid that represents a marking line within the cutting plane. This marking aid for the cutting line is connected angularly precisely to the cutting device and also congruently and ensures that the cut carried out according to the marking aid provides the desired miter cut. This cut is carried out first on the second profiled section.

As soon as the second profiled section has been removed or pushed away, the first profiled section can be moved to the cutting device or can be inserted at this time into the holding device; the cut is then performed with the same cutting adjustment.

Manipulation of the cutting table arrangement is extremely precise, in particular because it precludes transfer and contact errors as they would result from working with templates. Moreover, it is also intuitive and easy to operate because the parts or the adjustments relative to one another in their position already make visible the angles created for the profiled sections to be joined.

The same advantages apply for the method according to the invention.

BRIEF DESCRIPTION OF THE DRAWING

FIG. 3 is a plan view onto the cutting table arrangement according to FIG. 1 and FIG. 2 with adjustment of the cutting device for a miter cut (on one side).

DESCRIPTION OF THE PREFERRED EMBODIMENTS

Figure 1:
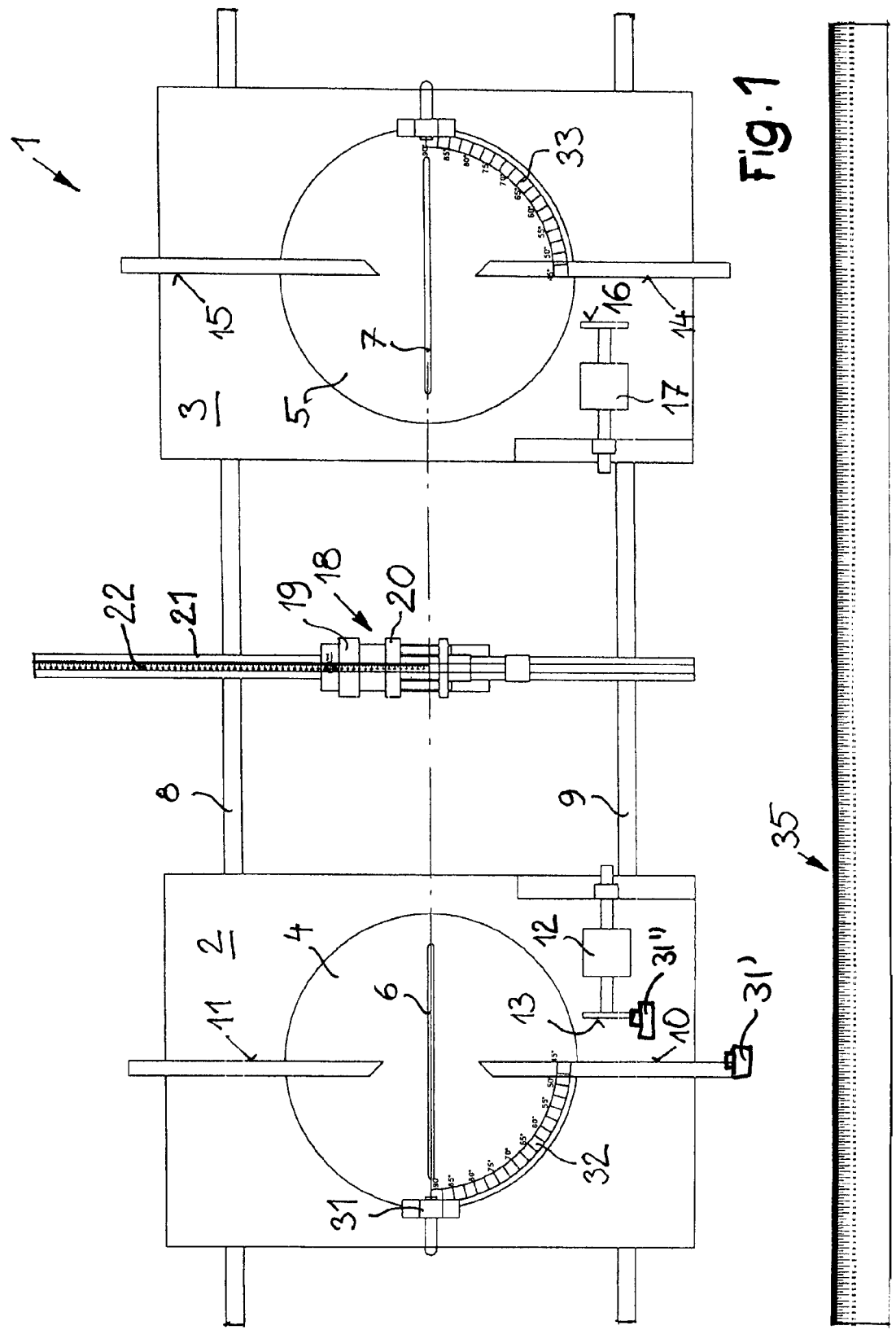
FIG. 1 is a plan view onto a cutting table arrangement according to the invention.

The drawing shows a cutting table arrangement referenced as a whole by numeral 1. The cutting table arrangement particularly ensures that profiled sections of plastic material can be provided with a miter cut simply and precisely for joining them by fusing or welding or other means to make a door frame or a window frame, in particular as a casement for a wing of a window. In particular in the case of modern windows where the profiled sections have a plurality of chambers with thin partitions and intermediate webs not only a flush external abutment of the profiled sections in the abutting area is desired but also, optionally, a proper alignment and contact of the inwardly positioned webs. Usually, straight profiled sections are used that in the case of door frames or window frames form the parallel lateral frame parts (jambs) that are to be connected with one another by an additional profiled section as a transverse beam that, depending on the predetermined design, can be straight, a semi-circular arch, a segmental arch or a three-center arch; this makes the cutting operation more difficult and, in the past, required often complex preparation including producing suitable templates.

The cutting table arrangement 1 according to the invention has a divided cutting table but, viewed as a whole, the cutting table has a working surface that is arranged in a flat plane and comprises two support plates 2, 3 each having an angle-adjustable cutting device 4, 5 submerged therein whose top surface is flush with the support surface 2, 3 and has a slot-shaped passage 6 or 7. A cutting means in the form of a circular saw can be moved from a position below the surface of the support plate upwardly through the slot-shaped passage 6 or 7 in order to carry out a cut in the direction of the slot-shaped passage and can be returned into the lowered guarded position so as to provide free space on the surface of the support plates.

The support plate 2 has a first holding device for a first profiled section with a two-part fixed stop 10, 11 and a second stop 13 that is movable by an actuator 12 that is actuatable by a pressure medium. Between both stops, a first (straight) profiled section can be secured wherein the stop surfaces of the stop 10, 11 facing the movable stop 13 are aligned on a common line that in plan view passes through the rotary center of the cutting device 4.

The support plate 3 is provided correspondingly with a further first holding device for a straight profiled section with the fixed stop 14, 15 and a movable stop 16 that is also adjustable by an actuator 17 that is actuated by a pressure medium and preferably operates pneumatically. The stop surfaces of the fixed stop 14, 15 that are facing the movable stop 16 are also aligned on a common line that passes through the rotary center of the cutting device 5. In both cases, the two-part fixed stops are interrupted in a central area of the cutting device 4 or 5 and spaced apart from one another in order to open a passage for the profiled sections to be cut.

Between the two support plates 2 and 3, a second holding device 18 with a fixed stop 19 and a moveable stop 20 is supported on rails 8, 9 by means of a guide rail 21 fixedly connected to the rails 8, 9. The moveable stop 20 is movable by an actuator that is actuated by a pressure medium on the guide rail 21. The second holding device 18 can be moved on this guide rail 21 wherein an adjusting scale 22 on the guide rail 21 facilitates an adjustment of a predetermined value and enables retrieval of a prior adjustment.

Figure 2:
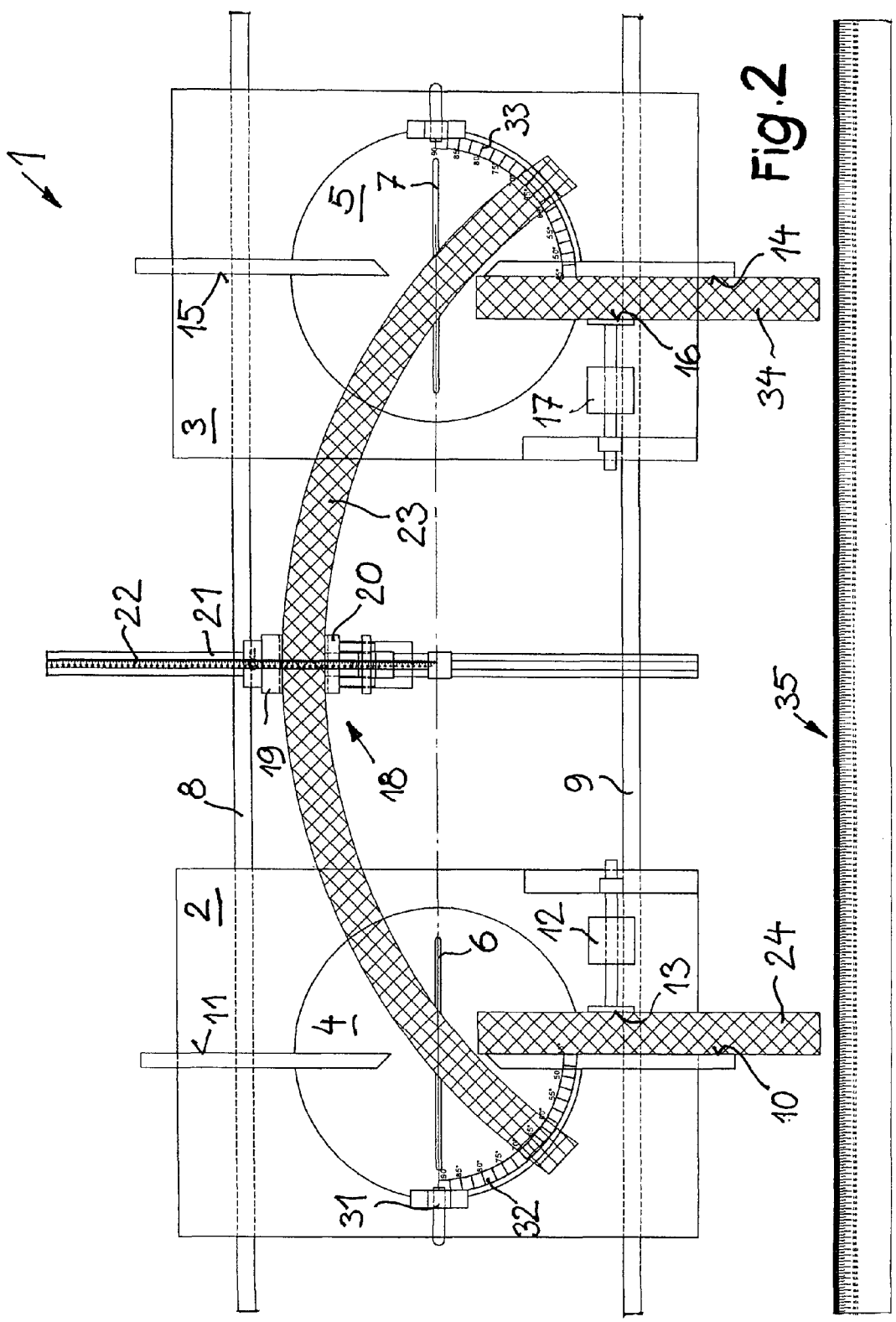
FIG. 2 is a plan view onto the cutting table arrangement according to FIG. 1 with profiled sections secured thereon and aligned relative to one another.

As shown in FIG. 2, the holding device 18 is provided for securing a (second) profiled section that must not be straight but can also be curved like an arch. Such arched profiled sections can be produced by means of well-known shaping or forming techniques from straight standard profiled elements in the softened state by means of templates.

In FIG. 2, a (second arched) profiled section 23 is secured in the holding device 18; the profiled section 23 has been moved relative to the situation shown in FIG. 1 about a predetermined height of the arch along the guide rail 21 so that the arch extends through the area of the cutting device 4 and 5, in particular through the gaps or passages that are left between the stops 10, 11 and 14, 15 in the central area of the cutting devices 4 and 5.

A first profiled section 24 has been clamped in the first holding device 10, 11, 13. Initially, the first profiled section 24 serves for setting the holding device to the appropriate profile width between the stop 10 and the stop 13. This is sufficient in order to make visible by means of a suitable marking device an (aligned) overlap area of the two profiled sections and to allow adjustment of the cutting device with its cutting angle to the desired miter cut.

In the context of an especially simple marking device, FIG. 3 shows a template 25 having the same width as the first profiled section; it can be placed onto the first profiled section 24 and onto the second profiled section 23 in order to mark on the second profiled section 23 the alignment lines 26, 27 of the first profiled section. Such a template 25 is practical even though it is understood that it is also possible to connect to the first holding device two longitudinally movable or vertically movable rulers relative to the lateral stop surfaces that enable marking of the alignment lines of the stop surfaces of the first holding device 10, 13 on the second profiled section 23. Also, light pointers 31' and 31" can be provided on the stop surfaces of the first holding device 10, 13; they make visible the alignment lines on the second profiled section 23 without a physical presence being needed for marking. The use of laser light elements is especially suitable.

As can be seen in FIG. 3, a square, approximately diamond-shaped overlap area 28 or penetration area of the profiled sections 23, 24 with two oppositely positioned corner points 29, 30 is provided; the miter cut is to performed through these points.

Accordingly, the cutting device 4 is properly aligned with an angular adjustment wherein a second marking aid 31 in the form of a laser light source for a light pointer provides a fine light beam that can be easily and precisely aligned in the cutting plane in which a circular saw blade that is subsequently lifted from below carries out the cut. It is understood that a template 25, as shown here, must be removed after cutting adjustment and before performing the cut. The cut is carried out only through the profiled section 23.

On the other side of the profiled section 23 the same procedure can be carried out, i.e., marking, adjusting, and cutting. For symmetric or uniform arches, as shown in an exemplary fashion by profiled section 23 and as is common in practice, the angular adjustment carried out on one side can be transferred onto the other side without having to carry out a separate marking step. A transfer by hand can be realized by using an angular scale 32 or 33 on the cutting devices 4 and 5. In the same way, for such a transfer a precise mechanical coupling of the angle adjustment of both cutting devices 4, 5 by the same magnitude but in opposite direction is possible.

The profiled section 23 is subsequently removed from the holding device or is moved out of the working area of the cutting devices 4, 5 together with the holding device in order to make space for the corresponding miter cut on the first profiled section 24 and a profiled section 34 parallel thereto; the profiled sections 24 are inserted into the appropriate holding devices and are moved therein so that, at least with their end areas, they cross the cutting lines of the cutting device 4, 5. Preferably, the respective profiled sections 24 or 34 are cut at the same time to the predetermined length.

Aside from a predetermined oversize that is to be fusing or burned off during welding at the miter cut surfaces, the cut sections of the profiled section corresponds entirely to the frame to be produced from the cut profiled sections. In this regard not only the arch height for arched profiled sections is adjusted in a predetermined way but also the spacing of the straight profiled sections 24 and 34 with the aid of the spacing of the support plates 2 and 3 from one another; this spacing can be adjusted and checked by means of the scale 35; the scale starts at zero in alignment with the guide rail 21 and the scaling extends to both sides. With this configuration cutting of profiled sections is faster and simpler; it is also improved with regard to ease of operation of the cutting process in order to prevent measuring and transfer errors.

The specification incorporates by reference the entire disclosure of German priority document 10 2005 062 305.0 having a filing date of 24 Dec. 2005.

While specific embodiments of the invention have been shown and described in detail to illustrate the inventive principles, it will be understood that the invention may be embodied otherwise without departing from such principles.

What is claimed is:

1. A cutting table arrangement for profiled sections to be joined at a predetermined angular position at miter cuts, the cutting table arrangement comprising:
   a cutting table;
   an angle-adjustable cutting device arranged on the cutting table;
   a first holding device arranged on the cutting table, wherein the first holding device secures a first straight profiled section in a direction of alignment with said angle-adjustable cutting device;
   at least one second holding device, wherein the at least one second holding device secures a second profiled section to be joined to the first straight profiled section in a predetermined position and at a predetermined angle relative to the first profiled section on the cutting table, wherein the first holding device and the at least one second holding device secure the first straight profiled section and the second profiled section in a common plane directly on the cutting table, wherein the common plane is the plane of cutting table;
   at least one first marking aid provided at the first holding device for providing an aligned lateral extension of the first profiled section toward the second profiled section; and
   a second marking aid for indicating a cutting line based on the aligned lateral extension, wherein the second marking aid is correlated with said angle-adjustable cutting device, wherein said angle-adjustable cutting device is aligned in a cutting position according to said cutting line indicated by said second marking aid and in said cutting position performs sequentially a miter cut according to said cutting line first on the second profiled section and subsequently on the first profiled section after removal of the second profiled section and positioning the first profiled section at said angle-adjustable cutting device so that the first and second profiled sections have matching miter cuts.

2. The cutting table arrangement according to claim 1, wherein the at least one second holding device is adjustable parallel to the direction of alignment of the first holding device.

3. The cutting table arrangement according to claim 1, wherein the at least one second holding device is aligned transversely to the direction of alignment of the first holding device.

4. The cutting table arrangem ent according to claim 1, wherein the at least one second holding device and the first holding device are positioned at a spacing relative to one another and the spacing is adjustable transversely to the direction of alignment of the first holding device.

5. The cutting table arrangement according to claim 1, wherein the first holding device has at one side a fixed stop that is aligned with a fixed pivot point of the cutting device.

6. The cutting table arrangement according to claim 1, wherein the at least one first marking aid is at least partially in the form of a light pointer.

7. The cutting table arrangement according to claim 1, wherein the at least one first marking aid is a template to be inserted into the first holding device, wherein the template has a width matching a width of the first profiled section.

8. The cutting table arrangement according to claim 1, wherein two of said first holding device are provided parallel to one another on opposite sides of the at least one second holding device, wherein two of said angle-adjustable cutting device are provided and each have one of said first two holding devices aligned therewith, wherein said two angle-adjustable cutting devices are positioned at a spacing from one another and wherein said spacing is adjustable.

9. The cutting table arrangement according to claim 1, wherein the cutting line is determined by points of intersection of the aligned lateral extension with the second profiled section.

\* \* \* \* \*